Feb. 21, 1956 R. W. GREEN 2,735,320
WIRE STRIPPING DEVICE
Filed Oct. 28, 1953 2 Sheets-Sheet 1
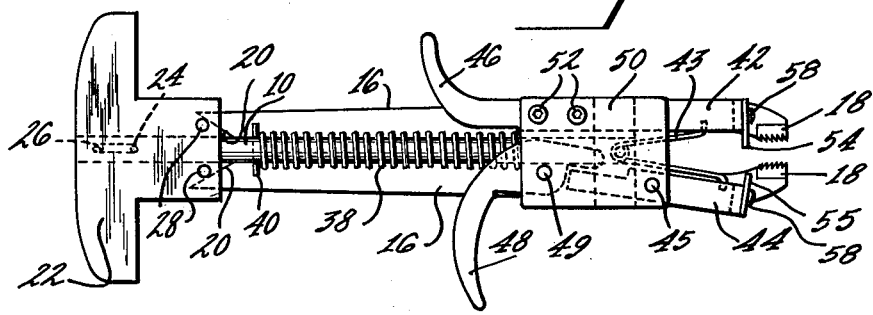
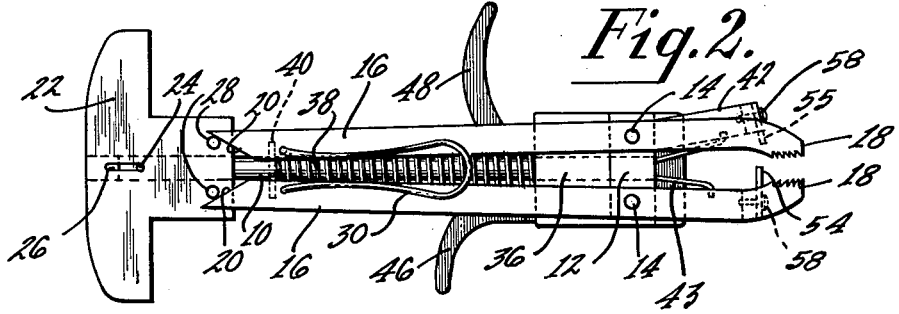
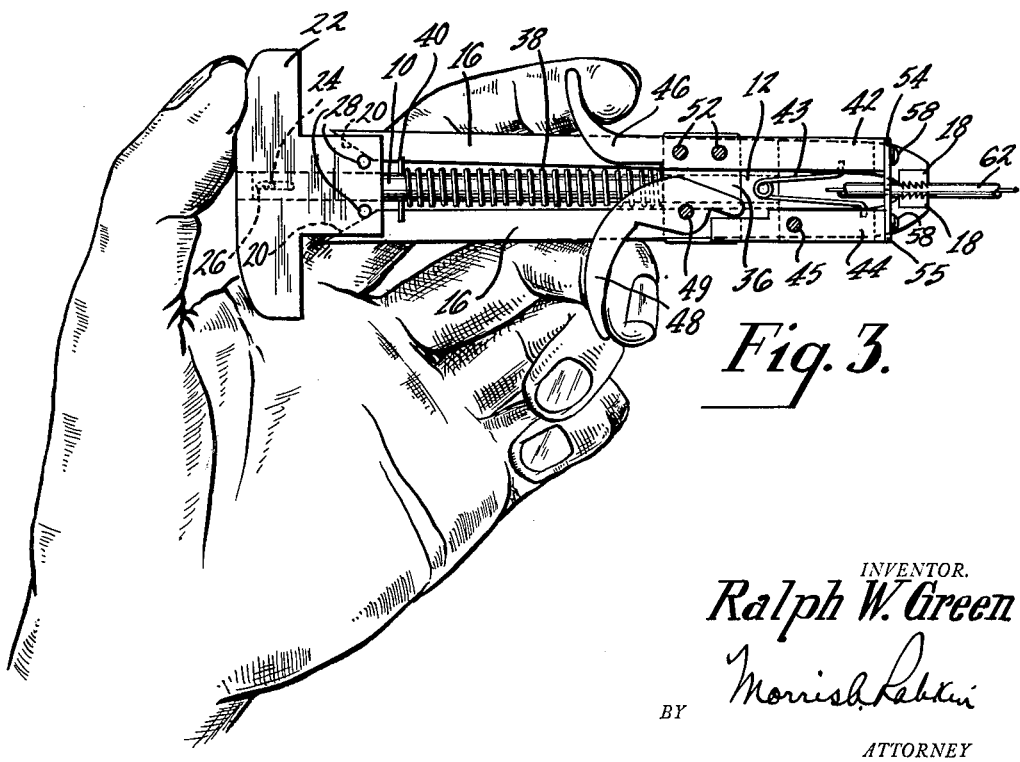
INVENTOR.
Ralph W. Green
BY
ATTORNEY Feb. 21, 1956 — R. W. GREEN — 2,735,320
WIRE STRIPPING DEVICE
Filed Oct. 28, 1953 — 2 Sheets-Sheet 2

INVENTOR.
Ralph W. Green
BY Morris A. Rabkin
ATTORNEY

United States Patent Office 2,735,320
Patented Feb. 21, 1956

2,735,320
WIRE STRIPPING DEVICE

Ralph W. Green, Elizabeth, N. J., assignor to Radio Corporation of America, a corporation of Delaware Application October 28, 1953, Serial No. 388,728
The terminal 15 years of the term of the patent to be granted has been disclaimed 5 Claims. (Cl. 81—9.5)

This invention relates to wire stripping devices, and more particularly to a compact tool which can be operated with one hand to strip the insulation from wires of various sizes.

In the construction of equipment, such as electronic equipment, where it is necessary to install many pieces of variously sized insulated wire, it is not always desirable nor practical to pre-cut and pre-strip the wire for its various uses. Hence, it may be desirable to solder, or otherwise attach, the wire in the equipment at one terminal and later to cut it to length and strip the insulation from it for the final connection. Since, oftentimes, these wires will be located in difficult to get at places, it is desirable to have an insulation stripping device which is compact overall, and especially one whose wire clamping and stripping portions require minimum space.

It is an object of this invention, therefore, to provide an improved wire stripping device especially adapted for use in hard to get at places.

It is a further object of this invention to provide an improved wired stripping device in which the movements of the parts are almost exclusively in line with the stripping operation.

It is another object of this invention to provide an improved wire stripping device in which the clamping jaws and stripping knives are of open construction permitting easy observation of the clamping and stripping operations.

It is another object of this invention to provide an improved wire stripping device which is efficient and easy to operate.

The device according to the present invention consists of a frame member which may be a shaft. At one end of the shaft, two elongated clamping arms are pivotally mounted. These arms extend in one direction away from the pivot point and terminate in clamping jaws to hold the wire, and in the other direction along the shaft to engage a handle mounted on the other end of the shaft and which is shaped to fit the palm of the hand or to be engaged by the thumb. The handle has a limited sliding movement on the shaft, which movement causes the clamping arms to alternately spread and contract, at this point, resulting in corresponding closing and opening of the clamping jaws. A sliding member is mounted on the shaft adjacent the pivot end thereof and held away from the handle end by a spring. This member carries the stripping assembly of two stripper arms with stripping knives mounted thereon and two trigger members, and is drawn toward the handle by these trigger members. One of the stripper arms is pivoted on the sliding member and is actuated by one of the triggers, which is also pivoted on the sliding member, to bring one stripping knife into cutting engagement with the other. The clamping jaws are normally held apart by springs, or the like, as are the stripping knives and the sliding member is normally held with the stripping knives adjacent the clamping jaws.

The above described device has a particular advantage in that the various functions of the device, namely, the opening and closing of the jaws, the opening and closing of the stripping knives, and the movement of the stripping knives relative to the jaws, are relatively independent of each other. This provides an advantage over other devices of this class in that the stripping knives can be closed or opened independently of the stripping motion of the device.

Further objects and advantages of this invention, as well as a better understanding thereof, will become apparent from a reading of the following description considered in conjunction with the accompanying drawings in which:

Figure 1 is a top view of a wire stripping device according to the present invention;

Figure 2 is a bottom view of the device shown in Figure 1;

Figure 3 is a top view of the device of Figure 1, with the cover plate removed, showing the clamping jaws and the stripping blades closed on a piece of wire;

Figure 4:
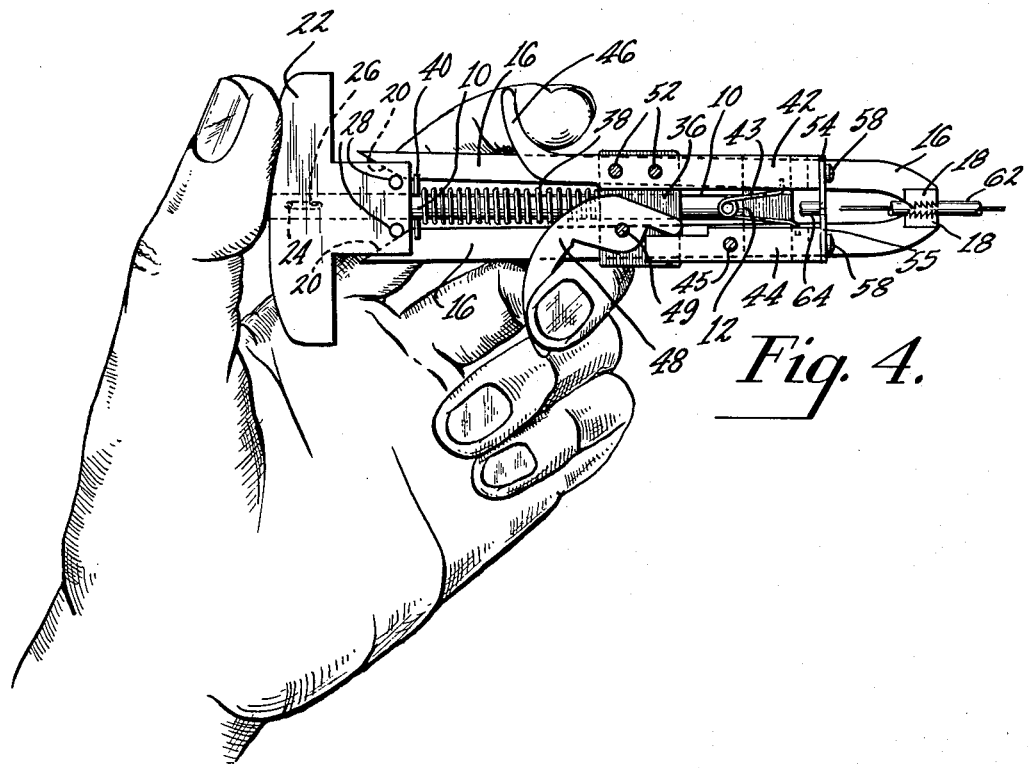
Figure 4 is a top view of the device of Figure 1, with the cover plate removed, showing the position of the stripping elements after the insulation has been stripped from a wire.

Referring to the drawings in more detail, Figures 1 through 5 illustrate one embodiment of the present invention in various stages of operation. In the exemplified embodiment, the device is built around a frame member which is shown as a cylindrical shaft 10. The shaft has block 12 rigidly mounted at one end thereof. Pivotally mounted on the block 12 by means of pins 14 and lying substantially parallel to the frame member 10 are a pair of elongated members 16 hereinafter called clamping arms. These clamping arms 16 are mounted intermediate their ends and extend, in one direction, a distance from the end of the shaft where they terminate in clamping jaws 18 within which a wire with insulation thereon may be held. The clamping arms 16 extend in the other direction along the shaft 10 and terminate near the other end of the shaft 10 in biased ends 20.

A handle 22 is slidably mounted on the end of the shaft 10 opposite to the block 12. The motion of the handle 22 is limited by a pin 24 extending from the shaft 10 through a slot 26 in the handle 22. A pair of pins 28 extend from the surface of the handle 22 to engage the biased ends 20 of the clamping arms 16. A wire spring 30 holds the biased ends of the clamping arms adjacent each other against the pins 28 on the handle 22.

Figure 5:
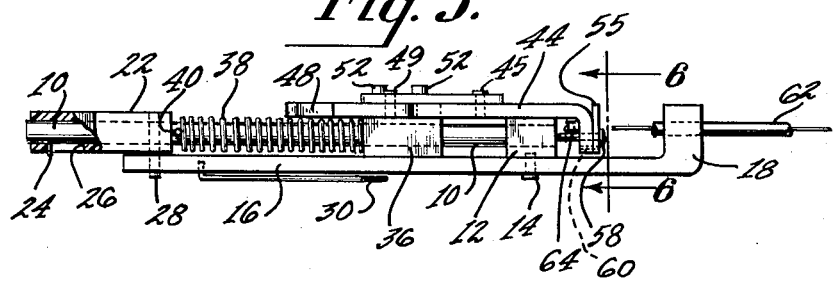
Figure 5 is an edge view of the device of Figure 4 shown, however, with the cover plate replaced.

A block 36 is slidably mounted on the shaft 10 intermediate its ends and serves as a mount for the stripping assembly of the device which comprises a pair of stripper arms 42 and 44 extending toward the clamping jaw end of the device and a pair of trigger members 46 and 48 extending toward the handle end of the device. Each of the arms 42 and 44 has a knife mounted thereon. The mount 36 is held against the block 12 by a helical compression spring 38 which is anchored at its other end by a pin 40 extending through the shaft 10. One of the stripper arms 42 and one of the trigger members 46 are rigidly attached to the mount 36 and may be in the form of one integral member. The other stripper arm 44 and the other trigger member 48 are each pivotally mounted on the mount 36 in a manner such that a pivotal movement of the trigger 48 induces a corresponding movement of the stripper arm 44. This mounting is accomplished by means of a face plate 50 which is rigidly attached to the mount 36 by means of screws 52. The stripper arm 44 and the trigger 48 are attached to the face plate 50 by means of rivets 45 and 49. The face plate is best shown in Figures 1 and 5 and is omitted from Figures 3 and 4 for the sake of clarity.

Figure 6:
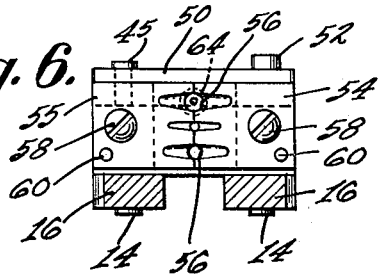
Figure 6 is a view of the stripping knives as seen from the plane of the line 6—6 of Figure 5 in the direction of the appended arrows.

A pair of stripping knives 54 and 55 are mounted on the ends of the stripper arms 42 and 44. The knives are held apart as shown in Figures 1 and 2 by a wire spring 43 attached between arms 42 and 44. Figure 6 illustrates the pair of knives as they appear in the closed position looking at the clamping jaw end of the device. The knives, as shown, form stripping apertures 56 for wires of three different sizes. In the exemplified embodiment, the arrangement shown for securing the blades to the ends of the stripper arms employs one screw 58 to tighten each knife onto its arm. The screws 58 may extend through the forward end portions of the arms 42 and 44 and may also be used as a stop for the stripper arm assembly by engaging the block 12, as shown in Figure 5. The pins 60 are also provided to prevent the knives from rotating about the screws 58 on their respective arms.

Operation

Figures 1 and 2 illustrate two opposite faces of a device according to the present invention as it appears when not in use. In order to use the device, the handle 22 is gripped by the thumb or by the palm of the hand and the triggers 46 and 48 are gripped by two fingers of the hand. A closing pressure by the hand causes the handle 22 to slide on the shaft 10 a distance permitted by the slot 26 and the pin 24. This movement of the handle 22 causes the pins 28 to spread the clamping arms 16 which pivot about the pins 14 and close the clamping jaws 18 on an insulated wire 62. Continued pressure on the trigger 48 causes it to rotate about its pivot 49 and actuate the stripper arm 44, bringing the stripper knife 55 into engagement with the knife 54 to cut through the insulation on the wire 62. This phase of the operation is shown in Figure 3. Continued pressure on both trigger members 46 and 48 will cause the mount 36 to be pulled back toward the handle 22 against the pressure of spring 38. This movement draws the stripping knives 54 and 55 away from the clamping jaws 18 and strips the insulation material 64 from the end of the wire 62. This phase of the operation is shown in Figures 5 and 6. The insulation 64, which has been stripped, is also shown.

The trigger member 48 can now be first released allowing the stripping knives to open under the pressure of the spring 43; then the hand pressure can be further released to permit the stripping assembly to slide back to its original position without damage to the exposed wire end which is still held in the clamping jaws.

What is disclosed is a simple, compact and efficient wire stripping tool whose parts, in operation, move essentially in a direction longitudinally of the wire being stripped. These characteristics render the tool very effective for use in electrical and electronic construction and repair work because of its adaptability to small or hard to get at places.

What is claimed is:

1. A wire stripping device comprising an elongated frame member, a handle member mounted at one end of said frame member, clamping arms pivotally mounted on said frame member, said arms terminating in clamping jaws at one end and engaging said handle member at the other end, a stripping assembly slidably mounted on said frame member, said assembly comprising stripping knives adapted to be closed on each other and means for closing said knives on an insulated wire, said stripping knives being disposed adjacent said clamping jaws, and means mounted on said stripping assembly by which said stripping assembly may be drawn away from said clamping jaws.

2. A wire stripping device comprising an elongated frame member, a handle member slidably mounted at one end thereof, a pair of elongated clamping arms pivotally mounted at the other end thereof, said arms extending longitudinally away from said frame member in one direction and terminating in wire clamping jaws and extending along said frame member in the other direction to engage said handle member, a block slidably mounted on said frame member, a pair of stripper arms mounted on said block and extending toward said clamping jaws, one of said stripper arms being pivotally mounted on said block, a stripping knife mounted on each of said stripper arms adjacent said clamping jaws, a pair of trigger members mounted on said block by means of which said block and stripper arms can be drawn along said frame member away from said clamping jaws, one of said trigger members being pivotally mounted and engaging said pivotally mounted stripper arm, spring means for returning said slidable block toward said clamping jaws, spring means for holding said clamping jaws in an open position, and spring means for holding said stripper arms in an open position.

3. A wire stripping device comprising an elongated frame member, a handle member slidably mounted at one end thereof, a pair of elongated clamping arms pivotally mounted at the other end thereof, said arms extending longitudinally away from said frame member in one direction and terminating in wire clamping jaws and extending along said frame member in the other direction and terminating in biased ends which are engaged by said handle member, a block slidably mounted on said frame member, a pair of stripper arms mounted on said block and extending toward said clamping jaws, one of said stripper arms being pivotally mounted on said block, a stripping knife mounted on each of said stripper arms adjacent said clamping jaws, a pair of trigger members mounted on said block, one of said trigger members being pivotally mounted for actuating said pivotally mounted stripper arm to close said stripping knives, said trigger members being adapted for drawing said block and said stripping knives away from said clamping jaws, spring means for returning said slidably mounted block toward said clamping jaws, spring means for holding said clamping jaws in an open position, and spring means for holding said stripper arms in an open position.

4. A wire stripping device comprising an elongated frame member, a handle slidably mounted at one end of said member, elongated clamping arms pivoted at the other end of said member, said arms terminating in clamping jaws adjacent said other end of said member and extending to and being engaged by said handle at said first named end of said member, a member slidably mounted on said frame member, stripping knives movable toward each other mounted on said last named member adjacent said clamping jaws, means also mounted on said last named member by which said stripping knives may be closed on an insulated wire, and means by which said slidably mounted member may be drawn away from said clamping jaws.

5. A wire stripping device comprising an elongated frame member, elongated clamping arms pivotally mounted at one end of said frame member, said arms extending longitudinally away from said frame member in one direction and terminating in wire clamping jaws and also extending in the other direction along said frame member, a handle slidably mounted at the other end of said frame member engaging said clamping arms to actuate said clamping jaws, a member slidably mounted on said frame member, a pair of stripper arms mounted on said last named member, one of said stripper arms being pivotally mounted thereon, said stripper arms extending toward said clamping jaws, stripping knives mounted on said stripper arms adjacent said clamping jaws, trigger means acting on said movable stripper arm by means of which said stripping knives may be closed upon each other, and means by which said slidably mounted member may be drawn away from said clamping jaws and toward said handle.

References Cited in the file of this patent
UNITED STATES PATENTS

| | | |
|---|---|---|
| 1,151,319 | Wood | Aug. 24, 1915 |
| 2,563,911 | Beck | Aug. 14, 1951 |
| 2,601,797 | Holt | July 1, 1952 |

FOREIGN PATENTS

| | | |
|---|---|---|
| 619,302 | Germany | Sept. 27, 1935 |